United States Patent [19]

Wright

[11] Patent Number: 4,810,164

[45] Date of Patent: Mar. 7, 1989

[54] PITCH CHANGE ARRANGEMENT FOR A VARIABLE PITCH FAN

[75] Inventor: William B. Wright, Derby, England

[73] Assignee: Rolls-Royce plc, Longdon, England

[21] Appl. No.: 119,475

[22] Filed: Nov. 12, 1987

[30] Foreign Application Priority Data

Dec. 24, 1986 [GB] United Kingdom ................ 8630942

[51] Int. Cl.⁴ ...................... B64C 11/06; B64C 11/38
[52] U.S. Cl. ..................................... 415/129; 416/158
[58] Field of Search ....................... 416/45, 48, 51, 156, 416/158; 415/129, 130

[56] References Cited

U.S. PATENT DOCUMENTS

| 2,113,438 | 4/1938 | Allred ................... 416/158 |
| 2,160,553 | 5/1939 | Martinotti ............ 416/51 X |
| 2,307,101 | 1/1943 | Blanchard et al. ....... 416/158 |
| 3,794,442 | 2/1974 | McMurtry ............ 416/157 X |
| 3,869,221 | 3/1975 | Wildner ............... 416/157 X |

FOREIGN PATENT DOCUMENTS

| 153529 | 3/1962 | U.S.S.R. ................................. 416/156 |
| 435376 | 11/1974 | U.S.S.R. ................................. 416/51 |
| 499518 | 1/1939 | United Kingdom ................ 416/158 |
| 1408153 | 10/1975 | United Kingdom ................ 416/156 |
| 2022534 | 12/1979 | United Kingdom ................ 416/156 |

Primary Examiner—Everette A. Powell, Jr.
Attorney, Agent, or Firm—Cushman, Darby & Cushman

[57] ABSTRACT

A pitch arrangement for a variable pitch fan assembly of a turbofan gas turbine engine comprises a plurality of fan blades, each of which has a root portion rotatably mounted, in a thrust bearing on a fan rotor. A control ring is arranged coaxially with and is rotatably mounted on the fan rotor, and each of the fan blades is connected to the control ring by a lever arm. The pitch of the fan blades is varied by rotation of the control ring in either direction. A plurality of hydraulic rams are arranged to drive the control ring through a plurality of bell cranks. The hydraulic rams are mounted on the fan rotor so that the pistons and shafts move in a radial direction such that the centrifugal force of the pistons and shafts is applied to the bell cranks so that a counter turning movement is applied to the control ring to oppose the centrifugal turning moment of the fan blades.

13 Claims, 4 Drawing Sheets

PITCH CHANGE ARRANGEMENT FOR A VARIABLE PITCH FAN

The present invention relates to a pitch change arrangement for a variable pitch fan of a turbofan gas turbine engine.

The present invention seeks to provide a pitch change arrangement for a variable pitch fan of a turbofan gas turbine engine, which is hydraulically operated and in which the centrifugal turning moment of the fan blades is opposed by the pitch change arrangement, and in which in the event of an hydraulic failure the pitch change arrangement will turn the fan blades to coarse setting to prevent turbine overspeed or a possible engine surge.

Accordingly the present invention provides a pitch change assembly for a variable pitch fan of a turbofan gas turbine engine comprising a plurality of fan blades circumferentially arranged and rotatably mounted on a fan rotor, a control ring arranged coaxially with and rotatably mounted on the fan rotor, each fan blade being connected to the control ring by a lever such that relative rotation between the control ring and the fan rotor varies the pitch of the fan blades, a plurality of circumferentially arranged hydraulic rams mounted on the fan rotor and arranged to be supplied with hydraulic fluid, each hydraulic ram comprising a piston, a shaft and a cylinder, the piston and shaft being arranged to move within the cylinder, each shaft being connected to the control ring by a bell crank such that movement of the pistons and shafts causes relative rotation between the control ring and the fan rotor, each hydraulic ram being arranged so that the pistons and shafts move radially such that the centrifugal force of the pistons and shafts is applied to the bell cranks so that a counter turning moment is applied to the control ring to oppose the centrifugal turning moment of the fan blades.

The total centrifugal force of the pistons and shafts may be arranged to provide a counter turning moment on the control ring which is greater than the total centrifugal turning moment of the fan blades such that the fan blades turn to course setting if the supply of hydraulic fluid fails.

Each of the bell cranks has a lever connected to the control ring, the fan blade lever length may be twice the length of the bell crank lever connected to the control ring.

A turbofan gas turbine engine comprising a core engine and a fan assembly, the core engine comprising in flow series compressor means, combustor means and turbine means, the fan assembly being positioned upstream of the core engine, the fan assembly comprising a plurality of fan lades circumferentially arranged and rotatably mounted on a fan rotor, a control ring arranged coaxially with and rotatably mounted on the fan rotor, each fan blade being connected to the control ring by a lever such that relative rotation between the control ring and the fan rotor varies the pitch of the fan blades, a plurality of circumferentially arranged hydraulic rams mounted on the fan rotor and arranged to be supplied with hydraulic fluid, each hydraulic ram comprising a piston, a shaft and a cylinder, the piston and shaft being arranged to move within the cylinder, each shaft being connected to the control ring by a bell crank such that movement of the pistons and shafts causes relative rotation between the control ring and the fan rotor, each hydraulic ram being arranged so that the pistons and shafts move radially such that the centrifugal force of the pistons and shafts is applied to the bell cranks so that a counter turning moment is applied to the control ring to oppose the centrifugal turning moment of the fan blades.

The total centrifugal force of the pistons and shafts may be arranged to provide a counter turning moment on the control ring which is greater than the total centrifugal turning moment of the fan blades such that the fan blades turn to course setting if the supply of hydraulic fluid fails.

Each of the bell cranks has a lever connected to the control ring, the fan blade lever length may be twice the length of the bell crank lever connected to the control ring.

The fan assembly may be driven by the turbine means via gear means.

The gear means may comprise a sun gear secured to and driven by shaft means, a plurality of star gears meshing with and driven by the sun gear and an annulus gear meshing with and driven by the star gears, the annulus gear being arranged to drive the fan assembly, the star gears being rotatably mounted in a carrier. The carrier may be secured to a static structure.

An intake means may extend axially through the fan assembly to supply air to the core engine, the intake means being formed at its radial extremity at least partially by the fan rotor. The intake means may be annular.

A plurality of struts may extend radially across the intake means, a first and a second pipe extends through each strut to supply hydraulic fluid to, and return, hydraulic fluid from, the hydraulic rams.

A muff structure may allow the transfer of hydraulic fluid between a static structure and the fan assembly, the muff structure comprising an outer member, a liner member coaxial with and secured within the outer member, and an inner member coaxial with and positioned within the liner member, the outer member being secured to the static structure, the inner member being secured to and rotating with the fan assembly, the outer member and the liner member defining therebetween two axially spaced annular manifolds, the liner member and the inner member defining therebetween two axially spaced annular manifolds arranged in the same axial position as the annular manifolds between the outer member and the liner member, the liner member having ports to interconnect the annular manifolds formed between the outer member and the liner member and the annular manifolds formed between the liner member and the inner member, the outer member having ports to connect the annular manifolds formed between the outer member and the liner member with the supply of hydraulic fluid, the inner member having ports to connect the annular manifolds formed between the liner member and the inner member with the hydraulic rams.

The present invention will be more fully described by way of example with reference to the accompanying drawings in which.

Figure 1:
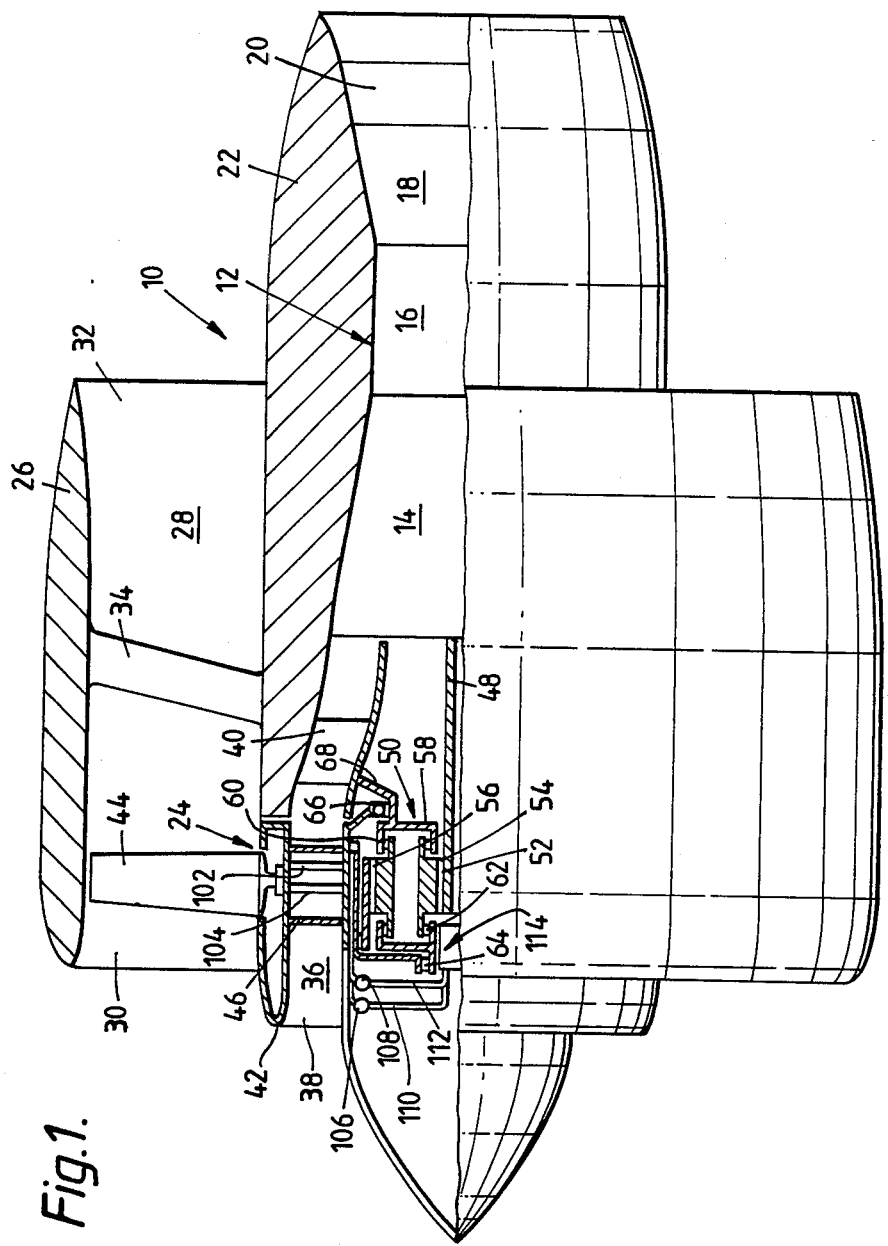
FIG. 1 is a partially cut away view of a turbofan gas turbine engine having a pitch change arrangement for a variable pitch fan according to the present invention.

A turbofan gas turbine engine 10 is shown in FIG. 1 and comprises a core engine 12 and a fan assembly 24. The core engine 12 comprises in axial flow series compressor means 14, combustor means 16 and turbine means 18,20. The core engine 12 is surrounded by a coaxial core casing 22. The compressor means may comprise a high pressure compressor only, or it may comprise in flow series a low pressure compressor and a high pressure compressor. Similarly the turbine means 18 may comprise a high pressure turbine only, or it may comprise in flow series a high pressure turbine and a low pressure turbine. The turbine means 20 comprises a power turbine for driving the fan assembly 24. The core engine 12 operates conventionally and will not be discussed further.

A fan casing 26 forms the radially outer surface of a fan duct 28, and the core casing 22 forms at least partially the inner surface of the fan duct. The fan duct 28 has an inlet 30 and an outlet 32 at the upstream and downstream ends respectively of the fan casing 26. A plurality of struts 34 are arranged to extend radially between the fan casing 26 and the core casing 22.

The fan assembly 24 is positioned upstream of the core engine 12 and is arranged to rotate coaxially within the fan casing 26. An annular intake duct 36 extends axially through the fan assembly 24 to supply air to the core engine 12, and the annular intake duct 36 has an opening 38 upstream of the fan assembly 24. The fan assembly 24 comprises a fan rotor 42 which carries a plurality of circumferentially arranged equi-spaced, radially outwardly extending, variable pitch fan blades 44. The fan rotor 42 defines at least partially the radially outer surface of the annular intake duct 36, and a plurality of aerodynamic struts 46 extend radially inwards from the fan rotor 42, across the annular intake duct 36, to a driving gear assembly 50.

The gear assembly 50 is driven by the turbine means 20 via a shaft 48, which extends coaxially through the core engine 12. The gear assembly 50 comprises a sun gear 52 which is secured to, and driven by, the shaft 48, a plurality of star gears 54 meshing with and driven by the sun gear 52 and an annulus gear 56 meshing with and driven by the star gears 54. The annulus gear 56 is drivingly connected to the radially inner ends of the struts 46 to drive the fan assembly 24. The star gears 54 are rotatably mounted in a carrier 58 by bearings 60 and 62, and the inner ends of the struts 46 and annulus gear 56 are rotatably mounted on the carrier 58 by axially spaced bearings 64 and 66 positioned on either axial side of the gear assembly 50. The carrier 58 is secured to a static structure 68 which extends in an upstream direction from a plurality of struts 40, which extend radially across the annular intake duct 36 from the upstream end of the core casing 22.

Figure 2:
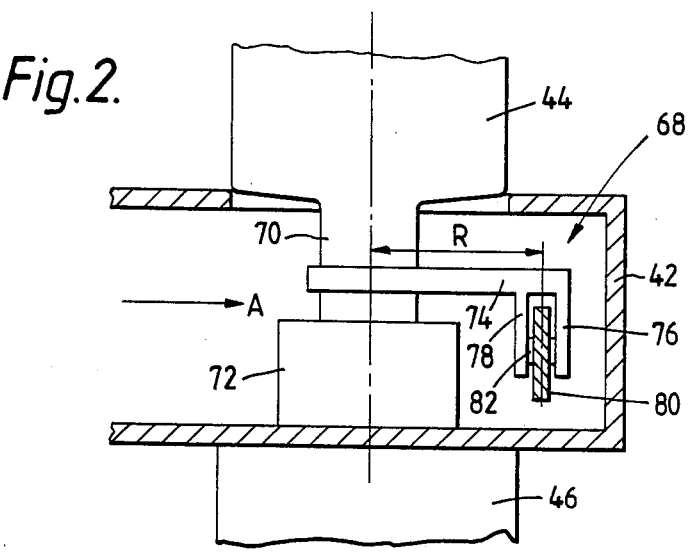
FIG. 2 is an enlarged sectional view through the pitch change arrangement in FIG. 1.
Figure 3:
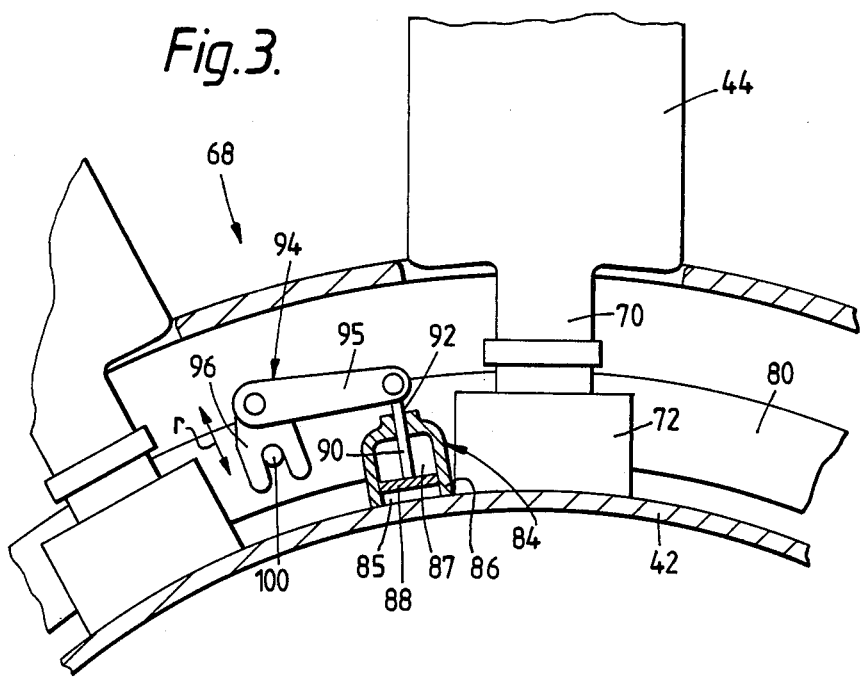
FIG. 3 is a view in the direction of arrow A in FIG. 2.
Figure 4:
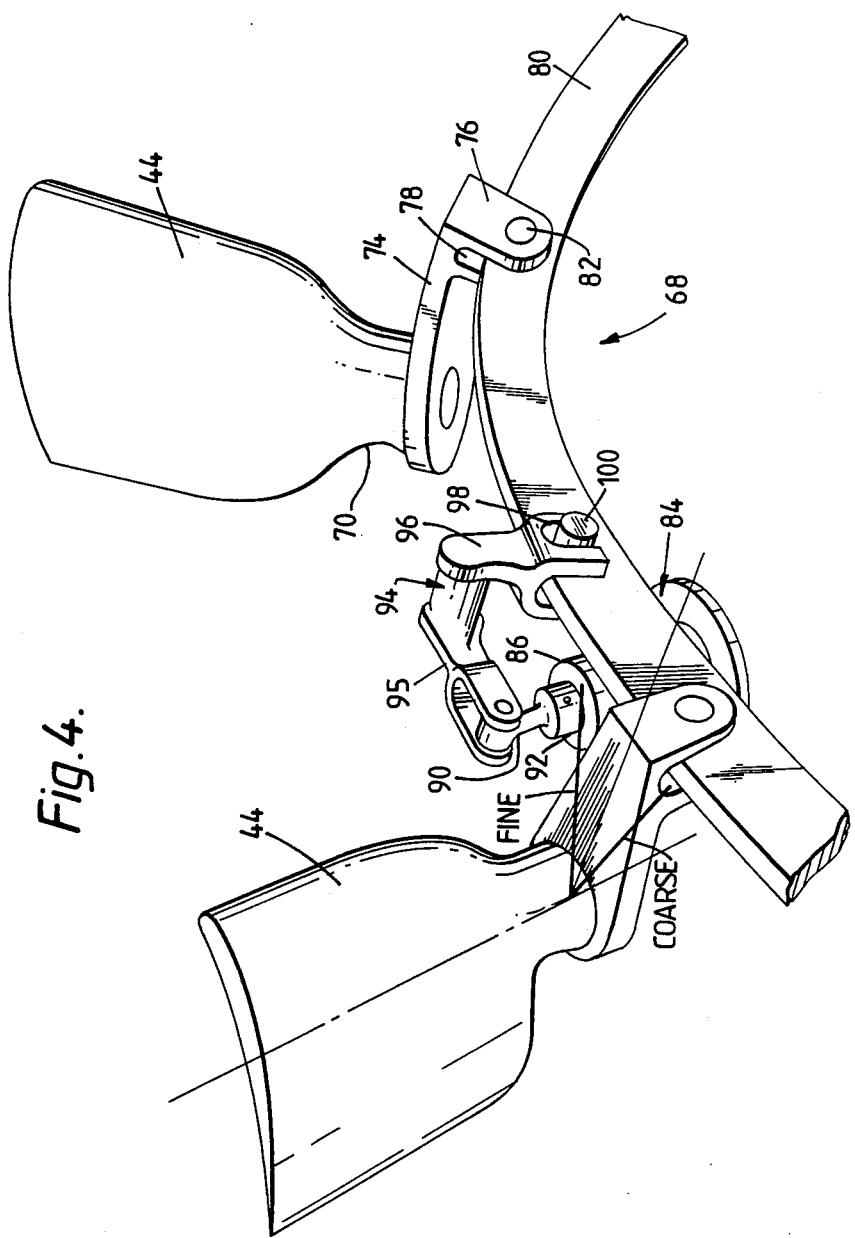
FIG. 4 is a perspective view of the pitch change arrangement for the variable pitch fan.

The variable pitch fan blades 44 and a pitch change arrangement 68 are shown more clearly in FIGS. 2, 3 and 4. Each of the variable pitch fan blades 44 has a root portion 70 which is rotatably mounted in a thrust bearing 72 on the fan rotor 42, to allow pitch change of the fan blades 44.

A control ring 80 is arranged coaxially with, and is rotatably mounted on, the fan rotor 42. Each of the fan blades 44 has a lever arm 74 which, extends from the root portion 70 and is connected to the control ring 80. The lever arms 74 have a length R. Each of the lever arms 74 has two axially spaced flanges 76 and 78, between which the control ring 80 is located, and each lever arm 74 is connected to the control ring 80 for example by a stud or pin 82 which extends through an aperture in the control ring 80 and apertures in the flanges 76 and 78.

The pitch of the fan blades 44 is varied by rotation of the control ring in either direction relative to the fan rotor 42, and the pitch of all the fan blades 44 is varied simultaneously.

The rotation of the control ring 80 is controlled by a number of hydraulic rams 84, which are equi-circumferentially spaced around the fan rotor 42, and which drive the control ring 80 through a number of equi-circumferentially spaced bell cranks 94. Each of the hydraulic rams 84 comprises a bottle shaped cylinder 86 within which is arranged a moveable piston 88 and a shaft 90. Two chambers 85 and 87 are formed in the cylinders 86 on opposite sides of the pistons 88. The shaft 90 is secured at one end to the piston 88, and the shaft extends through an aperture 92 in the cylinder 86 to, and is secured at the other end to, the bell crank 94. Each bell crank 94 comprises a lever 95 and a lever 96. The lever 96 has a length r, and has four fingers 98 between which the control ring 80 is located and which act on studs 100 on the control ring 80 to rotate the control ring 80. The lever 96 is therefore attached to the control ring 80, and the lever 95 is pivotally connected to the shaft 92.

Hydraulic fluid is supplied to the hydraulic rams 84 in order to move the pistons 88, which in turn move the bell cranks 94, and the bell cranks 94 rotate the control ring 80 which varies the pitch of the fan blades 44.

The hydraulic rams 84 are mounted on the fan rotor 42 so that the axes of the cylinders 86 lie in a radial direction in order that the pistons 88 and shafts 90 move in a radial direction with respect to the axis of rotation of the fan rotor 42. In operation rotation of the fan rotor 40 produces an inertial force, commonly called centrifugal force, acting on the fan rotor which is balanced by an equal centripetal force acting on the fan rotor. A centrifugal force also acts on each piston 88 and shaft 90, and they are not physically restrained by fixed structure. In this arrangement the full centrifugal force of the pistons 88 and shafts 90 is applied to the bell cranks 94 which in turn applies a turning moment on the control ring 80. The total centrifugal force of the pistons and shafts is arranged to provide a counter turning moment on the control ring which will oppose the total centrifugal turning moment of the fan blades. Preferably the total centrifugal force of the pistons and shafts is arranged to provide a counter turning moment on the control ring which is greater than the total centrifugal turning moment of the fan blades. In the event of a hydraulic failure, the fan blades will turn to the maximum coarse setting to prevent a turbine overspeed or a possible engine surge.

The blade centrifugal turning moment is proportional to $\sin 2\alpha$, where $\alpha$=pitch angle. In order to balance the fan blade centrifugal turning moment the fan blade lever 74 length (R) is twice the length (r) of the bell crank lever 94, connected to the control ring 80.

The cylinder 86 of each hydraulic ram 84 has two ports (not shown), at opposite ends of the cylinder, which are connected to pipes 102 and 104 respectively. The pipes 102 and 104 extend radially inwards through a respective strut 46, from the hydraulic rams 84, and are connected to annular manifolds 106 and 108 respectively. The annular manifolds 106 and 108 communicate with a muff structure 114 via pipes 110 and 112 respectively. The muff structure 114 allows the transfer of hydraulic fluid between the static structure i.e. carrier 58, and the fan rotor 42.

Figure 5:
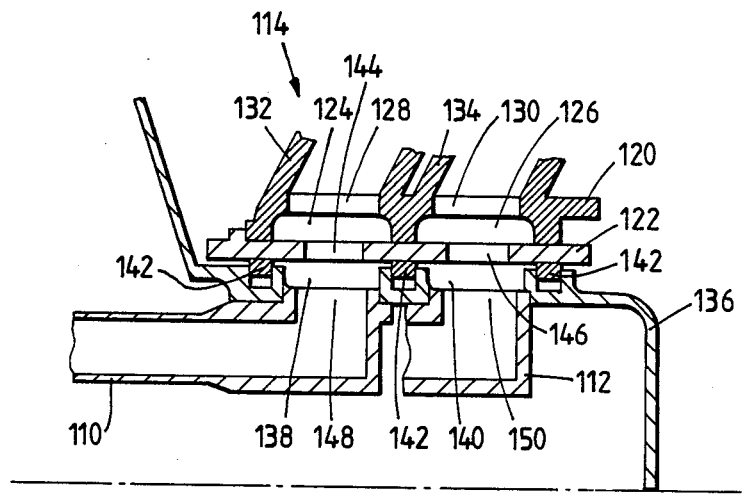
FIG. 5 is an enlarged sectional view through the muff structure in FIG. 1.

The muff structure 114 is shown more clearly in FIG. 5 and comprises an outer cylindrical casing 120, a liner 122 and an inner casing 136. The outer casing 120 has two circumferential grooves on its interior surface. The liner 122 is fitted coaxially within and is secured to the outer casing 120, and forms with the outer casing 120 two annular manifolds 124 and 126. The outer casing 120 has ports 128 and 130 which communicate with the annular manifolds 124 and 126 respectively, and which are also connected to pipes 132 and 134 respectively.

The outer casing 120 of the muff structure 114 is secured to the carrier 58 at the upstream end of the gear assembly 50, and the pipes 132 and 134 are arranged to extend axially through the carrier 58 to a shuttle valve (not shown) which controls the flow of hydraulic fluid to the hydraulic rams 84.

The inner casing 136 is of generally top hat shape, and has two circumferential grooves on its exterior surface. The inner casing 136 is positioned coaxially within the liner 122, and the circumferential grooves on the inner casing 136 are arranged in the same axial position as the grooves in the outer casing 120, and the grooves on the inner casing 136 form two annular manifolds 138 and 140 with the liner 122. Sealing rings 142 are fitted in further grooves on either side of the manifolds 138 and 140. The liner 122 has ports 144 and 146 to interconnect the annular manifolds 124 and 138, and 126 and 140 respectively.

The inner casing 136 has ports 148 and 150 which communicate with the manifolds 138 and 140 respectively, and which are also connected to the pipes 110 and 112 respectively. The inner casing 136 is secured to, and rotates with the fan rotor 42 and annulus gear 56.

In operation a pump (not shown) supplies oil, the hydraulic fluid, to the shuttle valve (not shown), which controls the flow of oil to the hydraulic rams 84. The shuttle valve (not shown) causes oil to be supplied via pipe 132, manifolds 124 and 138, pipe 110, manifold 106 and pipes 102 to the chambers 85 of the hydraulic rams 84 to cause rotation of the control ring 80 in one direction and pitch change of the fan blades 44 in one sense, and oil is returned from chamber 87 via pipes 104, manifold 108, pipe 112, manifolds 140 and 126, and pipe 134. Similarly the shuttle valve (not shown) causes oil to be supplied via pipe 134, manifolds 126 and 140, pipe 112, manifold 108, and pipes 104 to the chambers 87 of the hydraulic rams 84 to cause rotation of the control ring 80 in the opposite direction and pitch change of the fan blades 44 in the opposite sense, and oil is returned from chambers 85 via pipes 102, manifold 106, pipe 110, manifolds 138 and 124 and pipe 132. The shuttle valve, when in a mid position does not supply oil, and in this position locks the fan blades in the desired pitch setting.

The muff structure 114 is easily accessible for inspection and maintenance as it is positioned at the upstream end of the carrier 58 and gear assembly 50.

The static pressure generated in the hydraulic fluid is in the order of 400 lb/in$^2$ =3000 KN/m2, which effectively increases the counterbalance force, because of the difference between the areas on opposite sides of the piston upon which the hydraulic fluid acts.

The pitch change arrangement comprises for example eight hydraulic rams to drive the control ring. The fan blades are arranged to be variable through an angle of about 25° between fine and coarse pitch settings.

I claim:

1. A pitch change assembly for a variable pitch fan of a turbofan gas turbine engine comprising a fan rotor, a plurality of fan blades, a control ring, a plurality of levers, at least one hydraulic ram, and at least one bell crank, the fan blades being circumferentially arranged and rotatably mounted on the fan rotor, the control ring being arranged coaxially with and rotatably mounted on the fan rotor, each fan blade being connected to the control ring by a respective one of the plurality of levers such that relative rotation between the control ring and the fan rotor varies the pitch of the fan blades, the at least one hydraulic ram being mounted on the fan rotor and being arranged to be supplied with hydraulic fluid, the at least one hydraulic ram comprising a piston, a shaft and a cylinder, the piston and shaft being connected, the piston and shaft being arranged to move within the cylinder, the shaft of the at least one hydraulic ram being connected to the control ring by the at least one bell crank such that movement of the piston and shaft of the at least one hydraulic ram causes relative rotation between the control ring and the fan rotor, the at least one hydraulic ram being arranged such that the piston and shaft move radially so that the centrifugal force of the piston and shaft is applied to the at least one bell crank whereby a counter turning moment is applied to the control ring to oppose the centrifugal turning moment of the fan blades, said at least one bell crank having a lever connected to said control ring, said fan blade lever length being twice the length of said bell crank lever which is connected to said control ring.

2. A pitch change assembly as claimed in claim 1 in which there are a plurality of hydraulic rams and a plurality of bell cranks, the hydraulic rams being arranged circumferentially and being mounted on the fan rotor, each hydraulic ram comprising a piston, a shaft and a cylinder, the shaft of each hydraulic ram being connected to the control ring by a respective one of the plurality of bell cranks.

3. A pitch change assembly as claimed in claim 2 in which the total centrifugal force of the pistons and shafts is arranged to provide a counter turning moment on the control ring which is greater than the total centrifugal turning moment of the fan blades such that the fan blades turn to course setting if the supply of hydraulic fluid fails.

4. A turbofan gas turbine engine comprising a core engine and a fan assembly, the core engine comprising in flow series compressor means, combustor means and turbine means, the fan assembly comprising a fan rotor, a plurality of fan blades, a control ring, a plurality of levers, a plurality of hydraulic rams and a plurality of bell cranks, the fan blades being circumferentially arranged and rotatably mounted on the fan rotor, the control ring being arranged coaxially with and rotatably mounted on the fan rotor, each fan blade being connected to the control ring by a respective one of the plurality of levers such that relative rotation between the control ring and the fan rotor varies the pitch of the fan blades, the plurality of hydraulic rams being mounted on the fan rotor and being arranged to be supplied with hydraulic fluid, each hydraulic ram comprising a piston, a shaft and a cylinder, the piston and shaft of each hydraulic ram being connected, the piston and shaft of each hydraulic ram being arranged to move within the cylinder, the shaft of each hydraulic ram being connected to the control ring by a respective one of the plurality of bell cranks such that movement of the pistons and shafts of the hydraulic rams causes relative rotation between the control ring and the fan rotor, each of the plurality of hydraulic rams being arranged so that the pistons and shafts move radially such that the centrifugal force of the pistons and shafts is applied to the bell cranks whereby a counter turning moment is applied to the control ring to oppose the centrifugal turning moment of the fan blades, each of said belt cranks having a lever connected to said control ring, said fan blade lever being twice the length of said bell crank lever which is connected to said control ring.

5. A turbofan gas turbine engine as claimed in claim 4 in which the total centrifugal force of the pistons and shafts is arranged to provide a counter turning moment on the control ring which is greater than the total centrifugal turning movement of the fan blades such that the fan blades turn to course setting if the supply of hydraulic fluid fails.

6. A turbofan gas turbine engine as claimed in claim 4 in which the fan assembly is driven by the turbine means via gear means.

7. A turbofan gas turbine engine as claimed in claim 6 in which the gear means comprises a sun gear secured to and driven by shaft means, a plurality of spur gears meshing with and driven by the sun gear and an annulus gear meshing with and driven by the spur gears, the annulus gear being arranged to drive the fan assembly, the spur gears being rotatably mounted in a carrier.

8. A turbofan gas turbine engine as claimed in claim 7 in which the carrier is secured to a static structure.

9. A turbofan gas turbine engine as claimed in claim 4 in which the fan assembly is positioned upstream of the core engine.

10. A turbofan gas turbine engine as claimed in claim 9 in which an intake means extends axially through the fan assembly to supply air to the core engine, the intake means being formed at its radial extremity at least partially by the fan rotor.

11. A turbofan gas turbine engine as claimed in claim 10 in which the intake means is annular.

12. A turbofan gas turbine engine as claimed in claim 10 in which a plurality of struts extend radially across the intake means, a first and a second pipe extends through each strut to supply hydraulic fluid to and return hydraulic fluid from the hydraulic rams.

13. A turbofan gas turbine engine as claimed in claim 4 in which a muff structure allows the transfer of hydraulic fluid between a static structure and the fan assembly, the muff structure comprising an outer member, a liner member coaxial with and secured within the outer member and an inner member coaxial with and positioned within the liner member, the outer member being secured to the static structure, the inner member being secured to and rotating with the fan assembly, the outer member and the liner member defining therebetween two axially spaced annular manifolds, the liner member and the inner member defining therebetween two axially spaced annular manifolds arranged in the same axial position as the annular manifolds between the outer member and the liner member, the liner member having ports to interconnect the annular manifolds formed between the outer member and the liner member and the annular manifolds formed between the liner member and the and the inner member, the outer member having ports to connect the annular manifolds formed between the outer member and the liner member with the supply of hydraulic fluid, the inner member having ports to connect the annular manifolds formed between the liner member and the inner member with the hydraulic rams.

* * * * *